United States Patent Office 3,714,278 Patented Jan. 30, 1973

3,714,278

PREPARATION OF BIS(DIBROMOETHYL) BENZENES

Howard M. Relles, Rexford, and Charles M. Orlando and Robert W. Schluenz, Schenectady, N.Y., assignors to General Electric Company No Drawing. Filed Nov. 15, 1971, Ser. No. 199,000
Int. Cl. C07c *25/14*
U.S. Cl. 260—651 R 7 Claims

ABSTRACT OF THE DISCLOSURE

In the bromination of ethylbenzenes, ring bromination and bromination beyond the dibromoethyl stage of the side chains are minimized by carrying out the bromination in two stages. In the first stage, bromine is reacted with the desired diethylbenzene in the approximate ratio of 2 moles of bromine per mole of diethylbenzene. The bromination is carried out in the presence of visible light at a temperature no greater than 45° C. In the second stage, the reaction mixture is shielded from light and is reacted with an additional amount of bromine in the approximate ratio of 2 moles of bromine for each mole of diethylbenzene initially used. This latter reaction is generally initiated at ambient temperature followed by heating to complete the reaction.

This invention relates to a process of converting diethylbenzenes to their corresponding bis(dibromoethyl)benzenes. More particularly, this invention relates to the bromination of diethylbenzenes selected from the group consisting of o-diethylbenzene, m-diethylbenzene and p-diethylbenzene and mixtures thereof to give their corresponding bis(dibromoethyl)benzenes, which are readily dehydrobrominated with a wide variety of dehydrobrominating agents under dehydrobrominating conditions to the corresponding diethynylbenzenes which are useful for making polymeric acetylene compositions. In the making of these polymers, m-diethynylbenzene and mixtures thereof with p-diethynylbenzenes are the most useful. Therefore, our invention is more widely applicable to the bromination of m-diethylbenzene, p-diethylbenzene or mixtures thereof to give the corresponding bis(dibromoethyl)benzenes.

Polymeric acetylenes and a process for producing the same are disclosed in U.S. Patent 3,300,456—Allan S. Hay, assigned to the same assignee as the present invention. The polymers from diethynylbenzenes are in an extremely interesting group of polymers since they contain over 90% by weight carbon. The monoethynylbenzenes, for example, phenylacetylene, can be used as chain stoppers to regulate the molecular weight of the polymers from the diethynylbenzenes. Furthermore, the ethynylbenzenes are useful in making photosensitive compositions as disclosed in U.S. Pat. 3,594,175—Allan S. Hay, assigned to the same assignee as the present invention.

Because of the wide utility for the polyacetylenic polymers as disclosed in the aforementioned patents, it would be highly desirable to have an economical process for producing the ethynylbenzenes required as starting materials for the polymers.

A general procedure for converting olefins, having at least one hydrogen on each of the two carbon atoms joined by the olefinic double bond, to acetylenes is to halogenate such olefins to produce the corresponding dihaloalkane which is then dehydrohalogenated to the corresponding acetylene. Since chlorine is much more reactive than bromine in halogeneration reactions thereby leading to undesirable products in the chlorination step and also since hydrogen bromide is much more easily removed in the dehydrohalogenation step than is hydrogen chloride, bromine has been the preferred halogen to use in the conversion of olefins to acetylenes.

Bromine readily adds to styrenes to produce $\alpha,\beta$-dibromethylbenzenes and to divinylbenzenes to produce bis($\alpha,\beta$-dibromoethyl)benzenes. These compounds are readily dehydrobrominated with various alkaline agents known to dehydrobrominate aliphatic bromo compounds (for example, alcoholic solutions of sodium or potassium hydroxide or sodium or potassium alkoxides, sodium amide in either inert hydrocarbon or in liquid ammonia, etc.). An undesirable side reaction, especially with sodium amide, leads to considerable debromination to regenerate the olefin rather than dehydrobromination to produce the acetylenic compound. In order to suppress this side reaction, it has been recommended that a two-step procedure be used in which an ethanolic solution of an alkali metal hydroxide or an alkali metal alkoxide be used under mild dehydrohalogenating conditions, for example, in the temperature range of 0–10° C., to produce a monobromo olefin by removal of only one molecule of hydrogen bromide followed by dehydrobromination of the intermediate product under more vigorous conditions, for example, at elevated temperatures up to the reflux temperature to remove the other molecule of hydrogen bromide to produce the desired acetylenic compound.

Whenever chlorine has been substituted from bromine in the above reactions, the yields of the desired acetylenic compounds has always been lower. A good review of these various reactions and the problems encountered is found in Organic Reactions, vol. 5, chapter 1, John Wiley & Sons, Inc., New York (1949) and the references cited therein. One means of using chlorine in place of bromine in this reaction is disclosed and claimed in U.S. Pat. 3,594,423—Howard M. Relles, assigned to the same assignee as the present invention. However, these processes require the production of divinylbenzene from the corresponding diethylbenzenes prior to halogenation.

It would be highly desirable to be able to produce the desired bis(dihaloethyl)benzenes directly from the diethylbenzenes. If the halogen is bromine it does not matter whether the dibromoethyl groups are $\alpha,\beta$-dibromoethyl, $\alpha,\alpha$-dibromoethyl or $\beta,\beta$-dibromoethyl groups. Only a few publications have appeared on the bromination of ethylbenzenes. Fournier, Bull. Soc. Chim. France, Mem. [3] 7, 651 (1892) brominated p-diethylbenzene at 150–160° C. to obtain a tetrabromodiethylbenzene having a melting point of 157° C., but no yield is given. Naumann, J. prak. Chemie 4th, 1, 277 (1955), desired to make p-divinylbenzene. He used Fournier method to make 1,4-bis(1,2-dibromoethyl)benzene. Although he reported an 80% yield of a dark colored, crystalline, crude product, he did not report what various brominated products were in this product, nor did he give the yield of his desired product he obtained by purifying the crude product. We repeated his work and obtained a 90% yield of the crude product. By N.M.R. spectroscopy, this product was found to be a mixture of 1,4-bis(bromoethyl)benzenes, some having olefinic unsaturation. On a mole percentage basis, the distribution of the bromoethyl groups was 12% 1-bromoethyl, 66% 1,2-dibromoethyl, 4% 2-bromoethyl, 5% 1,1,2-tribromoethyl, the balance of 13% being a mixture of brominated 2-carbon aliphatic groups, mostly olefinic. Since some of the 1,2-dibromoethyl groups would be on the same benzene ring as the undesired groups, the yield of 1,4-bis($\alpha,\beta$-dibromoethyl)benzene is much less than 66%. Cava et al., Rev. Chim. Acad. Rep. Pouplaire Roumaine 7 (2) 737 (1962), reacted bromine dropwise with a solution of o-diethylbenzene in carbon tetrachloride at room temperature while illuminated with a 100 watt lamp and obtained a 32% yield of 1,2-bis($\alpha$-bromoethyl)benzene. Apparently they did not determine the other products.

Unexpectedly, we have discovered that diethylbenzenes, i.e., o-diethylbenzene, m-diethylbenzene, p-diethylbenzene or mixtures thereof can be readily brominated in high yields to bis(dibromoethyl)benzenes. Since the diethylbenzenes are liquids, no solvents need to be used. Almost all of these dibromoethyl groups are $\alpha,\beta$-dibromoethyl groups but some are $\alpha,\alpha$-dibromoethyl groups. Only a small amount of by-products are produced containing ring bromination and/or tribromoethyl groups. No detectable amount of tetrabromoethyl groups are formed.

Our process involves carrying out the bromination in two stages. In the first stage, bromine is reacted with the desired diethylbenzene in the approximate ratio of 2 moles of the former to 1 mole of the latter while the reaction mixture is exposed to visible light and the temperature is controlled so that it does not exceed 45° C. In the second stage, additional bromine is reacted with the product in the approximate ratio of 2 moles of bromine for each mole of the diethylbenzene initially used while the reaction mixture is shielded from light, both visible and invisible. Moderate heating is generally desired, at least towards the end of the reaction.

In the first stage, the product is bis(monobromoethyl) benzene. Production of dibromoethyl groups, especially $\alpha,\alpha$-dibromoethyl groups, at this stage is generally undesirable since they can be the precursors of tribromoethyl groups in the second stage. Undesirable by-products in both the first and second stage are ring-brominated products.

Bromination of the diethylbenzenes to form the bis($\alpha$-bromoethyl)benzenes occurs very rapidly at room temperature when the reaction mixture is exposed to the visible light found in any ordinary well-lighted laboratory room or hood. The intensity of the light, although having some influence on the distribution of products obtained, can be varied over a wide range as the examples will illustrate. It is more important to control the rate of addition of bromine to the reaction mixture so that a large excess is not present. When the bromine is added drop-wise, it instantly decolorizes during the initial stage of the reaction but the rate of the decolorization decreases as the amount of bromine added increases so that in the latter part of the addition, an excess can be present if the bromine is added too fast. This condition can also arise if the light is not of sufficient intensity, but this condition is self-evident because of the color and additional illumination can be provided. Excess bromine is undesirable since it tends to lead to ring bromination as well as production of higher brominated ethyl groups.

Another reason for not desiring an excess amount of bromine to be present, is that hydrogen bromide is evolved in the bromination reaction and will carry bromine with it out of the reactor. Such a loss is undesirable from a cost standpoint but the loss can be compensated for by analyzing for unbrominated ethyl groups after the bromine reaction is completed in the first stage and adding additional bromine calculated on the unbrominated ethyl groups determined. Slower addition or better scrubbing of the bromine from the exiting vapors can be used to stop the loss.

Since the reaction proceeds so readily at room temperature, generally there is no necessity for use of higher temperatures for the first stage, especially since high temperatures in this stage, increase ring bromination and higher bromination of the ethyl groups. However, since the reaction is exothermic, some rise in temperature above ambient conditions can be tolerated. Temperatures up to about 45° C. do not so increase the production of the undesirable products as to be intolerable. Generally, sufficient cooling is provided to maintain the reaction at or lower than ambient—generally 15–30° C.

As mentioned above, some bromine may be carried out of the reactor so that even though sufficient bromine is added to have a ratio of 2 moles of bromine per mole of diethylbenzene, 2 moles of bromine are not reacted per mole of diethylbenzene, An easy method for determining the amount of unreacted ethyl groups is through the use of N.M.R. spectroscopy. Sufficient bromine can then be added to compensate for the loss of bromine. Once the amount of bromine loss has been determined for a particular reactor and set of reaction conditions, the initial amount of bromine added can be adjusted based on previous experience, without need for analysis, although analysis can be used and is generally desirable.

After the first stage of the reaction is completed, the additional bromine for the second stage can be added. This stage is not as exothermic as the initial stage so the rate of addition can be increased accordingly with attention being paid to minimizing bromine loss from the reactor with the evolved HBr. Bromine loss will also be more favored by elevated temperatures unless an extremely efficient reflux condenser is used to remove the volatilized bromine from the HBr. Generally, we add the bromine at ambient room temperature and then gradually heat the reaction mixture basing the rate of heating on the rate of evolution of HBr. The brominated products are somewhat thermally unstable and losses will occur if too high a temperature is used. We therefore prefer to use as low a temperature as is consistent with a reasonable reaction time. Because of the melting points of the bis(dibromoethyl)benzenes, especially 1,4-bis($\alpha,\beta$-dibromoethyl)benzene, heating is desirable to maintain fluidity of the reaction mass. Heating can be to any temperature up to where undesirable decomposition of the product occurs. Generally temperatures in the range of 75–100° C. are perfectly adequate to obtain a rapid completion of the bromination with no thermal decomposition. However, lower temperatures can be used where longer reaction times are permissible and higher temperatures can be used where losses due to thermal decomposition can be tolerated.

During the second step of the bromination reaction, the reaction mixture should be shielded from light, both visible and invisible light. Preferably, the shielding should be sufficient to totally exclude the light. Where transparent glass reactors are used for the first reaction, wrapping of the outside of the glass vessel with metal foil is sufficient shielding for the second step. During the second step, the main reaction is the formation of bis($\alpha,\beta$-dibromoethyl)benzene. Although the production of $\alpha,\alpha$-dibromoethyl groups will not be undesirable, the particular reaction only produces a very small portion of these groups in comparison to the $\alpha,\beta$-dibromoethyl groups. Since the first step of the bromination reaction does not produce any $\beta$-bromoethyl groups, at least in an amount that can be detected, our second step produces no $\beta,\beta$-dibromoethyl groups in an amount that can be detected.

Because of the instability of the bis(dibromoethyl)-benzenes, the various products of the bromination reaction are not readily separated by distillation. However, this is not critical since after dehydrobromination of our product to the desired diethynylbenzenes, the latter can be separated from the impurities resulting from the undesired bromination reactions discussed above by the process disclosed in U.S. Pat. 3,594,437—Dwain M. White, assigned to the same assignee as the present invention, to produce diethynylbenzenes which are readily converted into the polymeric acetylenes described by Hay.

In order that those skilled in the art may properly understand our invention, the following examples are given by way of illustration and not by way of limitation. In all of the examples, parts are by weight, percentages are mole percents and temperatures are in degrees centigrade.

EXAMPLE 1

The purpose of this example is to illustrate means by which the proper amount of illumination can be determined and to demonstrate the effect of adding bromine faster than it is decolorized. All of the room and hood lights were turned off and the window blinds were closed. The reaction flask was Pyrex borosilicate glass having three necks and was equipped with a stirrer, thermometer, condenser and addition funnel. The flask was cooled with a cold water bath so that the temperature of the reaction mixture was in the range of 16–27°. In the reactions, the following light sources were used at the stated distance from the reaction mixture: (A) 100 watt incandescent—36"; (B) 100 watt incandescent—5"; (C) 275 watt sun lamp—5", and (D) 250 watt infrared lamp—12". Reactions (E) and (F) were carried out in a hood with the hood door down. The primary source of light was two 100 watt incandescent bulbs, 50 and 55" respectively, from the reaction flask. A secondary source of light were the fluorescent lights from the room. Reactions (A), (B), (C) and (E) were run by adding 37.6 g. (0.235 mole) of bromine dropwise over a 30 minute period to 13.4 g. (0.1 mole) of m-diethylbenzene, except for reaction (C), where the amount of bromine was 35.8 g. (0.224 mole).

In reaction (A), the build-up of bromine in the reaction mixture was evident from the color of the reaction mixture. A large amount of bromine was still present, two hours after addition had been completed. No more bromine was evident after 11 hours. In reaction (B), the color of the bromine disappeared rapidly throughout the addition until the very end when the last small amount of bromine required about five minutes for complete discoloration. In reaction (C), the color of the bromine was destroyed rapidly throughout the entire addition. In reaction (E), the build-up of bromine in the reaction mixture during the addition was evident by the color which did not disappear until 3.5 hours after addition was complete.

In reaction (D), 32.1 g. (0.201 mole) of bromine was added drop-wise during 20 minutes with rapid discoloration of the bromine and vigorous evolution of hydrogen bromide. Analysis by N.M.R. spectroscopy at this point showed that there was approximately 15 mole percent (ca. 0.03 mole) ethyl groups still present. Another 5.3 g. (0.033 mole) of bromine was added drop-wise during approximately eight minutes with the last few drops requiring approximately three minutes to completely decolorize.

In reaction (F), 32.1 g. (0.201 mole) of bromine was added drop-wise over 1.5 hours. The dark color of each drop was discharged rapidly and much hydrogen bromine was evolved. However, the rate of discharge of bromine color diminished somewhat towards the end of the addition. The amount of residual ethyl groups in the reaction mixture, as determined by N.M.R. spectroscopy, indicated that about 0.022 mole of bromine had been lost during reaction by volatization with the escaping hydrogen bromide. An additional 3.6 g. (0.022 mole) of bromine was added over a 10 minute period to the reaction mixture.

Analysis of all the above reaction mixtures by N.M.R. spectroscopy showed that the distribution of two-carbon side chain groups were as shown in Table I.

ethyl groups to monobromoethyl groups. Very intense illumination as illustrated by (C) and (D) tends to increase bromination of the aryl nucleus. However, yield of the desired monobromoethyl groups is comparable to less intense irradiated reaction mixtures as illustrated by (B) and (F).

EXAMPLE 2

Using reaction mixture (F) above, the reaction flask was completely covered with aluminum foil. On adding 40.0 g. (0.25 mole) of bromine in one addition without cooling an immediate exotherm to about 40° C. occurred with considerable hydrogen bromide being evolved. A 20° water bath was used to cool the reaction mixture which after one hour showed a somewhat slower rate of hydrogen bromide evolution. The reaction flask was placed in an oil bath heated to 85° which cause the rate of hydrogen bromide evolution to increase. After 30 minutes, N.M.R. spectroscopy showed the reaction was essentially complete. However, it was continued for 10 hours Analysis by N.M.R. spectroscopy showed that 96% of the ethyl groups were α,β-dibromoethyl groups, 3% were α-bromoethyl groups with the balance being other higher brominated ethyl groups. Even assuming that each one of the α-bromoethyl groups and the higher brominated ethyl groups were on the same benzene nucleus as an α,β-dibromoethyl group, the product was 92% 1,3-bis(α,β-dibromoethyl)benzene.

EXAMPLE 3

Based on the results of Example 1, (F), and Example 2, these brominations were repeated except that the total amount of bromine was added without analysis at the end of the first step. The procedure was as follows: Using 13.4 g. of m-diethylbenzene at a temperature of 20–27°, 37.0 g. (0.231 mole) of bromine was added drop-wise over a period of 3 hours. The reaction mixture was then shielded from light and while immersed in a cold water bath, 40.0 g. (0.25 mole) of bromine was added for a period of 7 minutes. The temperature was maintained between 20–29°. Three minutes after the bromine addition was completed, the reaction vessel was placed in an oil bath heated to a temperature of 80–90°. Vigorous hydrogen bromide and some bromine evolution occurred. As indicated by N.M.R. spectroscopy, the reaction was essentially complete after 25 minutes. The reaction was maintained in the oil bath overnight after which time an analysis by N.M.R. spectroscopy showed that 94.5% of the ethyl groups were α,β-dibromoethyl groups and 5% of the groups were monobromoethyl groups, which, of course, could be further brominated if desired. Again assuming that all of the monobromoethyl groups were on a benzene nucleus with a dibromoethyl group, the minimum amount of 1.3-bis(α,β-dibromoethyl)benzene was 89%. When p-diethylbenzene was used in place of the m-diethylbenzene in the above example, the yield of 1,4-bis-

TABLE I

| | Ar<br>$CH_2$<br>$CH_3$ | Ar<br>CH—Br<br>$CH_3$ | Ar<br>CH—Br<br>$CH_2$—Br | Ar<br>Br—C—Br<br>$CH_3$ | Ar<br>Br—C—Br<br>CH-Br | Ar—Br<br>CH—$CH_3$<br>Br | Ar—Br<br>CH—Br<br>$CH_2$—Br |
|---|---|---|---|---|---|---|---|
| A | 43.8 | 23.9 | 17.9 | 2.1 | | 9.1 | 3.2 |
| B | 2.9 | 81.4 | 1.3 | 1.3 | 1.6 | 11.4 | |
| C | 5.1 | 78.8 | 1.3 | 3.9 | 0.8 | 10.0 | |
| D | 2.0 | 79.7 | | 3.8 | 1.4 | 13.0 | |
| E | 27.5 | 41.5 | 22.2 | 1.0 | | 7.8 | |
| F | 3.4 | 84.8 | 4.2 | 0.4 | 1.7 | 5.5 | |

It is evident from (A) and (B) that light is necessary and that in those cases where large amounts of brominated ethyl groups are present after reaction, that increasing the amount of light will increase the amount of bromination of the ethyl groups. The results of (E) and (F) illustrate the desirability of not having excess bromine present since it favors the bromination to higher than the monobromoethyl groups at the expense of brominating the (α,β-dibromoethyl)benzene was 85%. However, in this case, some of the other groups present as by-products were β-bromovinyl groups which would just as readily dehydrohalogenate to the desired ethynyl group if the product was used for making diethynylbenzene.

Although the above examples have illustrated many modifications that can be made in this invention, other variations will be readily apparent to those skilled in the art and are within the full intended scope of the invention as defined by the appended claims.

What we claim as new and desire to secure by Letters Patent of the United States is:

1. The process of preparing bis(dibromoethyl)benzenes from diethylbenzenes which comprises reacting bromine with the desired diethylbenzene in the approximate ratio of 2 moles of the former to 1 mole of the latter by adding the bromine to the diethylbenzene at a rate commensurated with the rate that the bromine reacts with the diethylbenzene while the reaction mixture is exposed to visible light and the temperature is controlled so that it does not exceed 45° C., thereafter reacting additional bromine with the product in the approximate ratio of 2 moles of bromine for each mole of the diethylbenzene initially used while the reaction mixture is shielded from light.

2. The process of claim 1, wherein the diethylbenzenes are selected from the group consisting of m-diethylbenzene, p-diethylbenzene and mixtures thereof.

3. The process of claim 1, wherein the second reaction with bromine is hastened by heating the reaction mixture.

4. The process of claim 2, wherein the second reaction with bromine is hastened by heating the reaction mixture.

5. The process of claim 4, wherein the diethylbenzene is m-diethylbenzene.

6. The process of claim 4, wherein the diethylbenzene is p-diethylbenzene.

7. The process of claim 4, wherein the diethylbenzene is a mixture of m-diethylbenzene and p-diethylbenzene.

References Cited

Naumann: J. Prakt. Chim. 4 1, 277–82 (1955).

HOWARD T. MARS, Primary Examiner

U.S. Cl. X.R.

260—650 R; 204—163 H